(12) United States Patent
Mitani

(10) Patent No.: US 8,068,699 B2
(45) Date of Patent: Nov. 29, 2011

(54) IMAGING APPARATUS AND IMAGING METHOD

(75) Inventor: Hitoshi Mitani, Kanagawa (JP)

(73) Assignee: Sony Corporation (JP)

( * ) Notice: Subject to any disclaimer, the term of this patent is extended or adjusted under 35 U.S.C. 154(b) by 889 days.

(21) Appl. No.: 12/012,887

(22) Filed: Feb. 6, 2008

(65) Prior Publication Data

US 2008/0193047 A1 Aug. 14, 2008

(30) Foreign Application Priority Data

Feb. 9, 2007 (JP) .................. P2007-030978

(51) Int. Cl.
*G06K 9/32* (2006.01)
(52) U.S. Cl. ......... 382/298; 348/445; 348/556; 348/561
(58) Field of Classification Search .............. 348/63, 348/445, 556, 561, E5.111; 358/3.2; 382/298; 396/436
See application file for complete search history.

(56) References Cited

U.S. PATENT DOCUMENTS

| | | | | |
|---|---|---|---|---|
| 3,532,414 | A | * | 10/1970 | Higuchi et al. ............... 359/687 |
| 5,136,398 | A | * | 8/1992 | Rodriguez-Cavazos et al. ............... 348/445 |
| 5,327,235 | A | * | 7/1994 | Richards ............... 348/441 |
| 6,417,829 | B1 | * | 7/2002 | Jung et al. ............... 345/98 |

FOREIGN PATENT DOCUMENTS

| | | |
|---|---|---|
| JP | 2001211360 A | 8/2001 |
| JP | 2003319234 A | 11/2003 |
| JP | 2005079743 A | 3/2005 |
| JP | 2006121567 A | 5/2006 |
| JP | 2006217214 | 8/2006 |
| JP | 2007028283 A | 2/2007 |

OTHER PUBLICATIONS

Office Action from Japanese Application No. 2007-030978, dated Aug. 2, 2011.

* cited by examiner

*Primary Examiner* — Gregory F Cunningham
(74) *Attorney, Agent, or Firm* — Lerner, David, Littenberg, Krumholz & Mentlik, LLP

(57) ABSTRACT

An imaging apparatus includes imaging means for imaging an image at a first aspect ratio, and image processing means for converting an original image at the first aspect ratio, which is imaged by the imaging means, to a converted image at a second aspect ratio, which is different from the first aspect ratio, by discarding a section of the original image as a discard section, and creating the converted image by, if the selected magnification of the converted image is lower than that of the original image, reducing the size of the original image according to the magnification and then adding a margin to the reduced original image and discarding the discard section according to the magnification as necessary.

6 Claims, 3 Drawing Sheets

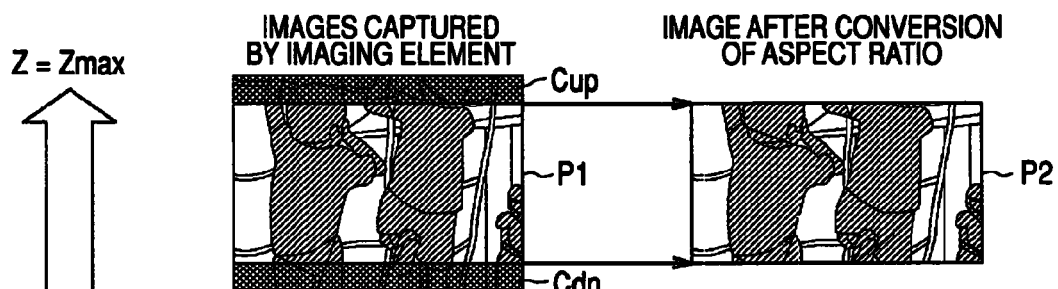
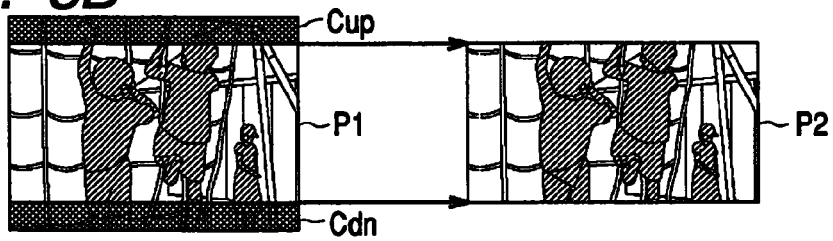
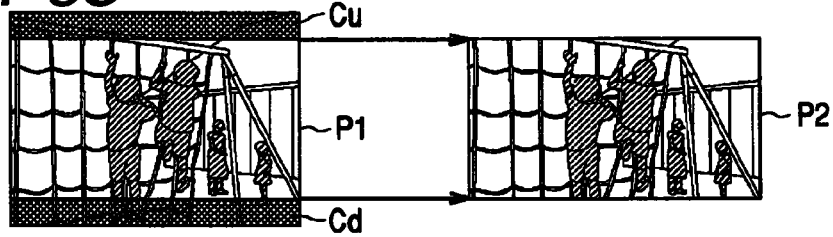
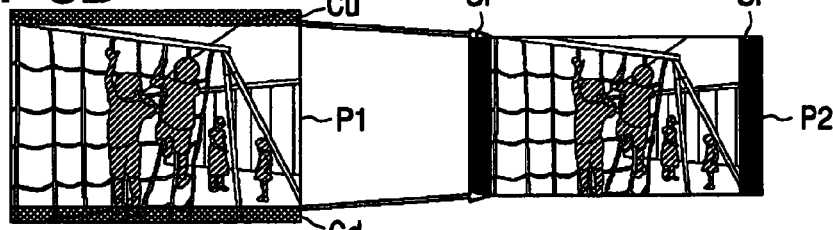
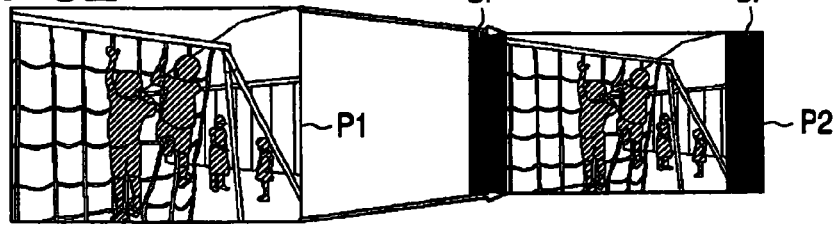

IMAGING APPARATUS AND IMAGING METHOD

CROSS-REFERENCE TO RELATED APPLICATIONS

The present application claims priority from Japanese Patent Application No. JP 2007-030978 filed in the Japanese Patent Office on Feb. 9, 2007, the entire content of which is incorporated herein by reference.

BACKGROUND OF THE INVENTION

1. Field of the Invention

The present invention relates to an imaging apparatus and an imaging method and may be suitable for the application to a digital still camera or a video camera, for example.

2. Description of the Related Art

In the past, an imaging apparatus such as a digital still camera and a video camera takes a still image or moving images at an aspect ratio of 4:3 (which will be called standard aspect ratio, hereinafter), which is equal to that of a television format. An imaging device included in the imaging apparatus also has the standard aspect ratio 4:3.

In recent years however, a high quality television format with a horizontally oriented screen, which is called High Definition Television (HDTV), has been widely spread, and with this, an imaging apparatus has been proposed which can take an image at a horizontally oriented aspect ratio of 16:9, for example (refer to JP-A-2006-217214 (Patent Document 1) for example).

SUMMARY OF THE INVENTION

An imaging apparatus that can take an image at a horizontally oriented aspect ratio as described above generally employs an imaging device with the standard aspect ratio because of the availability of the imaging device and because images may be taken at the standard aspect ratio in some cases.

However, as shown in FIG. 1, an imaging apparatus that takes an image at a horizontally oriented aspect ratio by using an imaging device at the standard aspect ratio creates a converted image P2 at the aspect ratio 16:9 by discarding top and bottom ⅛ sections (or a total of ¼ section) of an original image P1 at the aspect ratio 4:3, which is captured by an imaging device 1. For this reason, even in a case where a user defines a zoom lens at the widest angle for imaging a wider range, a part of the subject captured by the imaging device 1 is not reflected to the image, which causes a problem that it is difficult to take a wide range as intended by a user.

Accordingly, it is desirable to provide an imaging apparatus and imaging method, which can take a wide range as necessary.

According to an embodiment of the invention, there is provided an imaging apparatus including imaging means for imaging an image at a first aspect ratio, and image processing means for creating a converted image by converting an original image at the first aspect ratio, which is imaged by the imaging means, to the converted image at a second aspect ratio, which is different from the first aspect ratio, by trimming or cropping a partial area of the original image as a discard section, and, if the selected magnification of the converted image is lower than that of the original image, reducing the size of the original image according to the magnification and then adding a margin to the reduced original image and discarding the discard section according to the magnification as necessary.

The imaging range of the converted image can be increased by creating the converted image by reducing the size of the original image according to a given magnification and then adding a margin to the reduced original image and discarding a discard section according to the magnification as necessary.

According to another embodiment of the invention, there is provided an imaging method including the step of creating a converted image by converting an original image at a first aspect ratio, which is imaged by imaging means, to the converted image at a second aspect ratio, which is different from the first aspect ratio, by discarding a section of the original image as a discard section, and, if the selected magnification of the converted image is lower than that of the original image, reducing the size of the original image according to the magnification and then adding a margin to the reduced original image and discarding the discard section according to the magnification as necessary.

The imaging range of the converted image can be increased by creating the converted image by reducing the size of the original image according to a given magnification and then adding a margin to the reduced original image and discarding a discard section according to the magnification as necessary.

According to the embodiments of the invention, an imaging apparatus and imaging method can be implemented which can increase the imaging range of a converted image by creating the converted image by changing the aspect ratio of an original image imaged by imaging means by, if the selected magnification of the converted image is lower than that of the original image, reducing the size of the original image according to a given magnification and then adding a margin to the reduced original image and discarding a discard section according to the magnification as necessary.

BRIEF DESCRIPTION OF THE DRAWINGS

FIGS. 3A to 3E are schematic diagrams showing changes on an image taken as zoomed.

DESCRIPTION OF THE PREFERRED EMBODIMENTS

With reference to drawings, embodiments of the invention will be described below.

[1] Entire Configuration of Digital Still Camera

Figure 1:
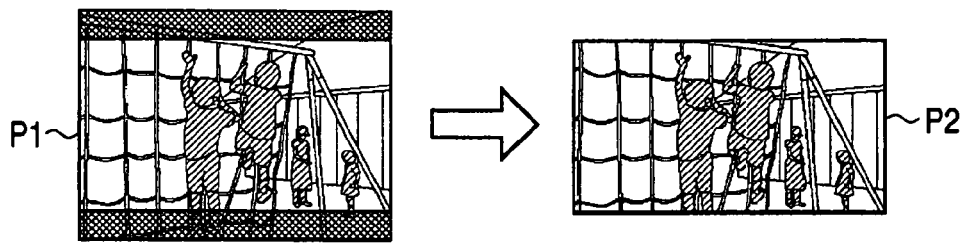
FIG. 1 is a schematic diagram for explaining aspect ratio conversion.
Figure 2:
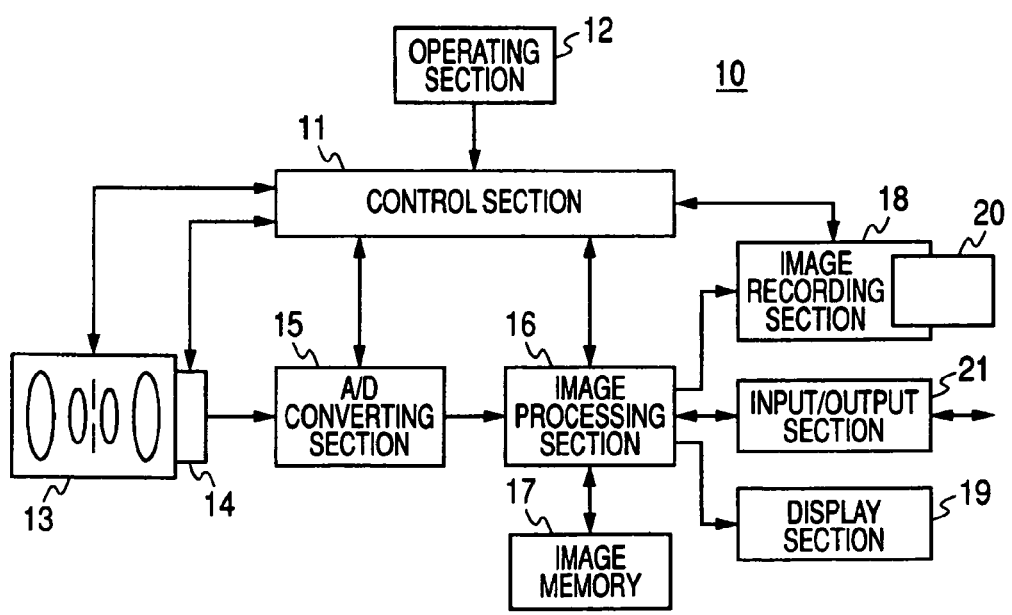
FIG. 2 is a block diagram showing a configuration of a digital still camera.

FIG. 2 shows a circuit configuration of a digital still camera (which will be simply called digital camera) 10 functioning as an imaging apparatus applying the invention. A control section 11 including a microprocessor, for example, controls the entire digital camera 10 based on a control program prestored in a Read Only Memory (ROM), not shown.

An operating section 12 includes operating elements such as a shutter button, a zoom button and a mode setting dial. The control section 11 in response to a user operation input through the operating section 12 controls components of the digital camera 10 in accordance with the user operation and implements a function of imaging an image in a capturing mode, displaying a taken image in a playback mode or setting in a setting mode.

Actuators for driving focusing, zooming and aperture for a zoom lens having a changeable imaging angle of view are attached to a lens section 13. In accordance with the control from the control section 11, zoom driving, focus driving or aperture driving is performed.

In other words, upon detection of a pressing operation on a zoom bottom (zoom-in or out) of the operating section 12, the control section 11 drives a zoom actuator (not shown) of the lens section 13 based on the detection and changes the imaging angle of view of the lens section 13. The control section 11 detects an out-of-focus amount by using image data imaged by an imaging device 14, drives a focus actuator (not shown) of the lens section 13 based on the detection and performs auto-focus control over the lens section 13. The control section 11 further drives an aperture actuator (not shown) of the lens section 13 based on the intensity, for example, of the image data imaged by the imaging device 14 and performs auto-exposure control.

The imaging device 14 includes a Charge Coupled Device (CCD) and has the standard aspect ratio 4:3. The imaging device 14 in the imaging mode converts light from a subject, which is input through the lens section 13, to an analog image signal, converts the analog image signal to a digital signal by an analog/digital converting section 15, and inputs the digital signal as image data to an image processing section 16.

The image processing section 16 in the imaging mode sequentially displays the image based on the input image data on a display section 19 to prompt a user to recognize the image. The image processing section 16 further causes an image memory 17 to store the image data temporarily in response to an imaging command supplied from the control section 11 based on a pressing operation on the shutter button of the operating section 12.

Then, the image processing section 16 loads the image data from the image memory 17 and performs processing such as quality correction, compression/encoding, aspect ratio conversion and extra zoom-out processing, which will be described later. The image processing section 16 further adds information relating to the image data such as information describing an imaging condition for an imaging operation and characteristic information such as intensity information to the image data as imaging information and forms and supplies image data file storing the image data and the imaging information to an image recording section 18. The image recording section 18 records the image data file in a recording medium 20 including a flash memory.

The image processing section 16 in the imaging mode converts the image data supplied from the imaging device 14 to image data at an aspect ratio defined by a user and displays and records the result.

In other words, in a case where the standard aspect mode 4:3 is selected in the setting mode, the image processing section 16 displays and records the image data at the standard aspect ratio of 4:3, which has been taken by the imaging device 14, as it is, without converting the aspect ratio.

On the other hand, in a case where a wide aspect mode with the aspect ratio 16:9 is selected in the setting mode, the image processing section 16 converts the aspect ratio from 4:3 to 16:9 by trimming (or cropping) top and bottom ⅛ section (or a total of ¼ section) of the image data imaged by the imaging device 14 and displays and records the result.

In response to a playback command supplied from the control section 11 based on a playback instruction on the operating section 12, an image recording section 18 in the playback mode loads the image data file from the recording medium 20 and supplies the image data file to the image processing section 16.

The image processing section 16 in the playback mode performs playback processing such as decoding processing on the image data included in the image data file supplied from the image recording section 18 and then displays the image based on the image data on the display section 19 to prompt a user to recognize the image.

In addition, the image processing section 20 supplies the image data being currently taken or played image data to an external display machine (not shown) such as a monitor to display through an input/output section 21 and may further exchange image data with an external machine (not shown) such as a personal computer through the input/output section 21.

[2] Electronic Zoom-Out Processing According To An Embodiment of The Invention

The digital camera 10 has a zoom lens as described above, and an imaging angle of view can be optically changed by operating a zoom button in the operating section 12 (which will be called optical zoom, hereinafter). In other words, a user may press a zoom-in button in the operating section 12 to change the imaging angle of view of the zoom lens toward the tele side such that a subject can be taken larger. A user may further press a zoom-out button in the operating section 12 to change the imaging angle of view of the zoom lens toward the wide side such that a subject in a wider range can be taken in a wider range. Here, the magnification Z is "1" in a case where the zoom lens is set at the wide end, and the magnification Z is "Zmax" in a case where the zoom lens is set at the tele end.

In other words, FIG. 3C shows the state where the zoom lens is set at the wide end (where the magnification Z=1), and FIG. 3A shows the state that the zoom lens is set at the tele end (where the magnification Z=Zmax). FIG. 3B shows the state that the zoom lens is set between the wide end and the tele end (where 1<Z<Zmax).

The digital camera 10 can take an image at the wide aspect ratio 16:9 by selecting a wide aspect mode in user setting, as described above, and a horizontally oriented image with a spacious feeling can be obtained.

However, in order to convert image data imaged by the imaging device 14 to one at the wide aspect ratio, a converted image P2 at the aspect ratio 16:9 is created by discarding the top and bottom (the top discard section Cup and bottom discard section Cdn in FIGS. 3A to 3C) of an original image P1 at the aspect ratio 4:3 captured by the imaging device 14. Therefore, the top and bottom sections of the original image P1 are not reflected to the converted image P2 even by setting the zoom lens at the widest side (as shown in FIG. 3C). As a result, the imaging range is disadvantageously narrower than that with the standard aspect ratio.

For that reason, in a case where the zoom-out button is pressed with the zoom lens at the wide end (FIG. 3C) in the wide aspect ratio mode, the digital camera 10 of this embodiment of the invention gradually reduces the heights of the top discard section Cup and bottom discard section Cdn to increase the imaging area upward and downward as shown in FIG. 3D. In this case, since the aspect ratio of the imaging range is more vertically oriented than the wide aspect ratio 16:9, the aspect ratio of the converted image P2 is kept at 16:9 by adding vertically oriented margins Sr and Sl to the left and right sides of the imaging range. The pseudo zoom-out processing beyond the range of optical zoom according to this embodiment of the invention is called "extra zoom out".

The state at the wide end of the extra zoom out is the state that the top discard section Cup and bottom discard section Cdn disappear as shown in FIG. 3E as a result of the continuous extra zoom out, where the magnification Z is "Zmin".

In this way, the digital camera 10 of this embodiment of the invention can take a wider range by performing the extra zoom out in a range of $Zmin1 \leq Z<1$ in the wide aspect mode in addition to the normal optical zoom range ($1 \leq Z \leq Zmax$).

In reality, the image processing section 20 in the extra zoom out reduces the size of the original image P1 according to the magnification Z ($Zmin1 \leq Z<1$) and then cuts out the reduced image at the height equal to that of the converted image P2. The discarded top and bottom parts here correspond to the top discard section Cup and bottom discard section Cdn. Therefore, the heights of the top discard section Cup and bottom discard section Cdn in the extra zoom out vary continuously according to the magnification Z.

Then, the image processing section 20 adds margins Sr and Sl to the left and right sides of the cut image, and adjusts the entire width so as to be equal to that of the converted image P2. Therefore, the widths of the margins Sr and Sl also vary continuously according to the magnification Z.

In other words, the image processing section 20 in the extra zoom out creates the converted image P2 by reducing the size of the original image P1 according to the magnification Z and then performing discarding and addition of margins thereto according to the aspect ratio of the converted image P2.

The image data thus obtained by the extra zoom out is displayed on the display section 19, like the image data obtained by the optical zoom, and is recorded in the recording medium 20 in response to the press on the shutter button.

Next, with reference to the flowchart shown in FIG. 4, a zooming processing routine by the digital camera 10 including the extra zoom out will be described in a case where the wide aspect mode is selected.

Figure 4:
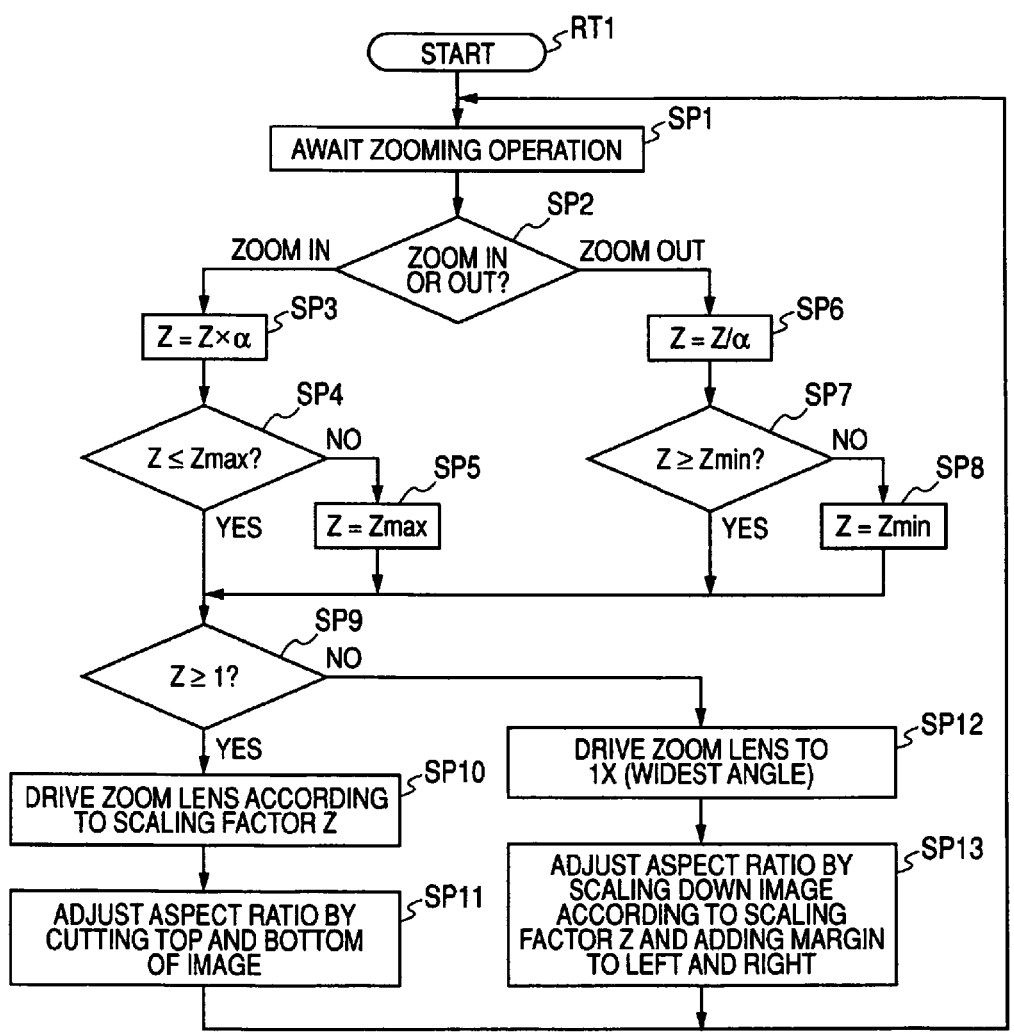
FIG. 4 is a flowchart showing a zooming processing routine.

The control section 11 of the digital camera 10 in response the selection of the wide aspect mode in the imaging mode starts the zooming processing routine RT1 shown in FIG. 4 and awaits an operation on the zoom button in the operating section 12 at predetermined intervals (such as every 0.5 seconds) in step SP1. If any pressing operation on the zoom button is detected, the control section 11 moves to the next step SP2.

The control section 11 in step SP2 determines either zoom-in operation or zoom-out operation as the operation on the zoom button between.

In step SP2, if the operation detected by the step SP1 is the pressing operation on the zoom-in button, the control section 11 moves to step SP3.

The control section 11 in step SP3 calculates a new magnification Z (or updates the magnification Z) by multiplying the currently defined magnification Z by a zoom changing coefficient a and moves to the next step SP4. Here, the initial value of the magnification Z is $1 \leq Z \leq Zmax$, and the zoom changing coefficient $\alpha$ may be $\alpha=1.05$, for example.

The control section 11 in step SP4 determines whether the updated magnification Z is equal to or lower than Zmax or not. If the positive result is obtained in step SP4, this means that the magnification Z as a result of the zoom-in operation is equal to or lower than Zmax and within the zooming range of the digital camera 10 (in the optical zoom and the extra zoom out). The control section 11 in this case moves to the next step SP9 without changing the updated magnification Z.

On the other hand, if the negative result is obtained in step SP4, this means that the imaging magnification Z as a result of the zoom-in operation is higher than Zmax and is beyond the tele end of the zooming range. The control section 11 in this case moves to step SP5 where the value of the updated magnification Z is changed to Zmax again and moves to the next step SP9.

On the other hand, if the operation detected by step SP1 is the pressing operation on the zoom-out button in step SP2, the control section 11 moves to step SP6.

The control section 11 in step SP6 calculates a new magnification z by dividing the currently defined magnification Z by the zoom changing coefficient α and moves to the next step SP7.

The control section 11 in step SP7 determines whether the updated magnification Z is equal to or higher than Zmin or not. If the positive result is obtained in step SP7, this means that the magnification Z as a result of the zoom-out operation is equal to or higher than Zmin and within the zooming range (of the optical zoom and extra zoom out) of the digital camera 10. The control section 11 in this case moves to the next step SP9 without changing the updated magnification z.

On the other hand, if the negative result is obtained in step SP7, this means that the magnification Z as a result of the zoom-out operation is lower than Zmin and is beyond the wide end of the extra zoom out. The control section 11 in this case moves to step SP8 where the value of the updated magnification Z is changed to Zmin again and moves to the next step SP9.

The control section 11 in step SP9 determines whether the updated magnification Z is equal to or higher than 1 or not.

If the positive result is obtained in step SP9, this means that the updated magnification Z is equal to or higher than 1 and is within the range of the optical zoom. The control section 11 in this case moves to step SP10 where the zoom actuator is driven according to the magnification Z to change the imaging angle of view and moves to the next step SP11.

The control section 11 in step SP11 controls the image processing section 20 to create the image data of the converted image P2 at the wide aspect ratio 16:9 by discarding the top discard section Cup and bottom discard section Cdn of the original image P1 captured by the imaging device 14 and converting the aspect ratio, as shown in FIGS. 3A to 3C. Then, the control section 11 returns to step SP1 and awaits the operation on the zoom button again.

On the other hand, if the negative result is obtained in step SP9, this means that the updated magnification Z is lower than 1 and is within the extra zoom out. The control section 11 in this case moves to step SP12 where the zoom actuator is driven to set the zoom lens at the wide end (that is, to an optical power 1×) and moves to the next step SP13.

The control section 11 in step SP13 controls the image processing section 20 to create the image data of the converted image P2 at the wide aspect ratio 16:9 by reducing the size of the original image P1 according to the magnification Z ($Zmin1 \leq Z<1$) and then cutting out the reduced image with the height equal to that of the converted image P2 and adding the margins Sr and Sl to the left and right sides of the cut image. Then, the control section 11 returns to step SP1 and waits the operation on the zoom button again.

[3] Operations and Effects

In the configuration above, the control section 11 of the digital camera 10 in response to the selection of the wide aspect mode in the imaging mode creates the converted image P2 at the wide aspect ratio 16:9 having a horizontally oriented, spacious feeling by discarding the top and bottom, as the top discarding Cup and bottom discarding Cdn, of the original image P1 imaged by the imaging device 14 at the aspect ratio 4:3.

The control section 11 in this case drives the zoom actuator according to the magnification Z selected by a zoom operation to perform the optical zoom in the range $1 \leq Z \leq Zmax$.

In addition, the control section 11 in response to the selection of the magnification Z lower than 1 ($Zmin1 \leq Z<1$) by a further zoom out operation creates the converted image P2 by performing the extra zoom out of setting the zoom lens at the wide end, then reducing the size of the original image P1 according to the magnification Z, discarding the top discard section Cup and bottom discard section Cdn according to the magnification Z and adding the margins Sr and Sl to the left and right sides.

In the extra zoom out, the horizontal imaging range is equal to that of the wide end (Z=1) of the optical zoom, but the vertical imaging range is wider beyond the wide end of the optical zoom. Therefore, by performing the extra zoom out, a wider range can be taken by effectively using the original image P1 imaged by the imaging device 14.

For example, when imaging a tall building is attempted but it is difficult to capture the top and bottom parts of the building even with the wide end of the optical zoom in the wide aspect mode, the extra zoom out of this embodiment of the invention may be performed to take the whole building.

With the configuration above, a wider range can be taken beyond the wide end of the optical zoom, which can provide wider variations in angle of view than that of the case with the optical zoom only, by creating the converted image P2 by discarding the top discarding section Cup and bottom discarding section Cdn and adding the margins Sr and Sl to the left and right sides if the magnification Z below 1 is selected in the wide aspect mode.

[4] Other Embodiments

Having described the case where an original image at the aspect ratio 4:3 is converted to the converted image at the aspect ratio 16:9 in the wide aspect mode according to the embodiment above, the invention is not limited thereto. The aspect ratio of the original image is not limited to 4:3, and the aspect ratio of the converted image is not limited to 16:9.

Having described the case where an original image is further converted to a horizontally oriented converted image according to the embodiment above, the invention is not limited thereto. The invention is also applicable to a case where the converted image is vertically oriented, compared with the original image, such as a case where the original image captured by an imaging device having the aspect ratio 16:9 is converted to the converted image having the aspect ratio 4:3. In this case, the aspect ratio of the converted image is adjusted by discarding the left and right sides of the original image in the optical zoom range, and the aspect ratio is adjusted by adding margins to the top and bottom sides of the converted image in the extra zoom out range.

Having described that the extra zoom out is performed in a case where the magnification Z, which is wider side than the optical zoom range, is selected according to the embodiment above, the invention is not limited thereto. In a case where a magnification Z, which is more tele side than the optical zoom range, is selected, processing (so called electronic zoom in) may be performed including cutting out a section of an original image and enlarging the cut section according to the magnification Z. In this case, about the optical zoom range, the extra zoom out of this embodiment of the invention is performed on the wide side, and the electronic zoom in is performed on the tele side. Thus, significant wider variations in angle of view can be obtained than that of the case with the optical zoom only.

Having described the embodiment in which the extra zoom out is performed if the magnification Z on the much wider side than the wide end in a digital camera including a zoom lens the angle of view of which is optically changeable, the invention is not limited thereto. The invention is also applicable to a digital camera including a fixed focus lens. Also in this case, performing the extra zoom out allows imaging a wider range.

Having described the embodiment in which the invention is applied to a digital still camera, the invention is not limited thereto. The invention is widely applicable to a cellular phone or mobile information terminal having a camera function or an imaging apparatus that takes a still image or moving images, such as a video camera.

The invention is applicable to various imaging apparatus that takes a still image and/or moving images.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   imaging means for imaging an image at a first aspect ratio; and
   image processing means for creating a converted image by converting an original image at the first aspect ratio, which is imaged by the imaging means, to the converted image at a second aspect ratio, which is different from the first aspect ratio, by discarding a section of the original image as a discard section, and, if the selected magnification of the converted image is lower than a magnification of one,
   i. reducing the size of the original image according to the magnification and
   ii. then adding a margin to the reduced original image and discarding the discard section according to the magnification to maintain the second aspect ratio.

2. The imaging apparatus according to claim 1, wherein:
   the second aspect ratio is more horizontally oriented than the first aspect ratio; and
   the image processing means:
   creates the converted image by discarding the top and bottom sections of the original image as the discard section; and
   if the selected magnification of the converted image is lower than a magnification of one, creates the converted image by adding the margin to the horizontal side of the reduced original image.

3. The imaging apparatus according to claim 1, wherein the second aspect ratio is more vertically oriented than the first aspect ratio; and
   the image processing means:
   creates the converted image by discarding the left and right sections of the original image as the discard section; and
   if the selected magnification of the converted image is lower than a magnification of one, creates the converted image by adding the margin to the vertical side of the reduced original image.

4. The imaging apparatus according to claim 1, wherein:
   the imaging means has angle-of-view changing means for optically changing the imaging angle of view within a range; and
   the image processing means creates the converted image by reducing the size of the original image according to the magnification with the imaging angle of view of the imaging means at a wide end of the range and then adding a margin to the reduced original image and discarding the discard section according to the magnification as necessary.

5. An imaging method comprising the step of:

creating, by a processor, a converted image by converting an original image at a first aspect ratio, which is imaged by the imaging means, to the converted image at a second aspect ratio, which is different from the first aspect ratio, by discarding a section of the original image as a discard section; and if the selected magnification of the converted image is lower than a magnification of one, i. reducing the size of the original image according to the magnification and ii. then adding a margin to the reduced original image and discarding the discard section according to the magnification to maintain the second aspect ratio.

6. An imaging apparatus comprising:

an imaging unit configured to image an image at a first aspect ratio; and an image processing unit configured to create a converted image by converting an original image at the first aspect ratio, which is imaged by the imaging device, to the converted image at a second aspect ratio, which is different from the first aspect ratio, by discarding a section of the original image as a discard section, and, if the selected magnification of the converted image is lower than magnification of one, i. reduce the size of the original image according to the magnification and ii. then adding a margin to the reduced original image and discard the discard section according to the magnification to maintain the second aspect ratio, wherein at least one of the imaging unit or the image processing unit includes a processor.

* * * * *